US011002621B2

(12) United States Patent
Arslan et al.

(10) Patent No.: US 11,002,621 B2
(45) Date of Patent: May 11, 2021

(54) METHOD AND DEVICE FOR DETERMINING TORQUE EXERTED ON A SHAFT INCLUDING TRANSFERRING TORQUE TO A GEARBOX BY THE SHAFT AND EXERTING AXIAL FORCE ON THE SHAFT DEPENDENT ON THE TORQUE EXERTED BY THE SHAFT TO THE GEARBOX

(71) Applicant: Siemens Aktiengesellschaft, Munich (DE)

(72) Inventors: Erkan Arslan, Nuremberg (DE); Tilo Moser, Munich (DE); Dirk Scheibner, Nuremberg (DE); Juergen Schimmer, Nuremberg (DE); Juergen Zettner, Veitsbronn (DE); Stefan Von Dosky, Karlsruhe (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 15/343,829

(22) Filed: Nov. 4, 2016

(65) Prior Publication Data

US 2017/0131161 A1   May 11, 2017

(30) Foreign Application Priority Data

Nov. 5, 2015   (DE) .......................... 102015221745.0

(51) Int. Cl.
*G01L 3/10*  (2006.01)
*G01L 3/14*  (2006.01)
(Continued)

(52) U.S. Cl.
CPC .............. *G01L 3/10* (2013.01); *B60L 3/0061* (2013.01); *F16H 1/08* (2013.01); *G01L 3/1464* (2013.01); *G01L 5/0019* (2013.01)

(58) Field of Classification Search
CPC ....... G01L 3/10; G01L 5/0019; G01L 3/0061; G01L 3/1442; G01L 3/102; G01L 3/105;
(Continued)

(56) References Cited

U.S. PATENT DOCUMENTS 5,190,232 A * 3/1993 Brandon ................ B65H 18/26
242/533.4
7,937,236 B2 * 5/2011 Wallin .................. G01L 25/003
702/104

(Continued)

FOREIGN PATENT DOCUMENTS

DE   10 2012 210 578 A1   12/2013
DE   10 2014 204 714 A1   9/2015

*Primary Examiner* — Brandi N Hopkins
(74) *Attorney, Agent, or Firm* — Cozen O'Connor

(57) ABSTRACT

A drive, method and a device for determining the torque of a shaft, wherein gear wheels engaged with one another in a gearbox serve to apply an axial force to the shaft, where the axial force is induced by helical teeth of the gear wheels, the axial force of the shaft is determined using a force sensor and/or a position sensor, and where the torque is determined arithmetically from the measured axial force such that a static and dynamic measurement of the torque on the shaft can be advantageously performed.

8 Claims, 5 Drawing Sheets

(51) Int. Cl.
*B60L 3/00* (2019.01)
*F16H 1/08* (2006.01)
*G01L 5/00* (2006.01)

(58) Field of Classification Search
CPC ......... G01L 15/221; G01L 3/103; F16H 1/08; B60L 3/0061; H01L 41/125; Y10T 29/4902
See application file for complete search history.

(56) References Cited

U.S. PATENT DOCUMENTS

| | | | |
|---|---|---|---|
| 2003/0117028 A1* | 6/2003 | Agnes | H02K 1/185 310/68 R |
| 2003/0233888 A1* | 12/2003 | Gierling | G01L 3/1442 73/862.31 |
| 2006/0108881 A1* | 5/2006 | Hauger | H02K 29/08 310/68 B |
| 2013/0328455 A1* | 12/2013 | Wu | F16C 32/0476 310/68 B |
| 2014/0271188 A1* | 9/2014 | Dillon | B64D 45/00 416/1 |
| 2014/0292131 A1* | 10/2014 | Ramamoorthy | H02K 16/02 310/114 |

* cited by examiner

METHOD AND DEVICE FOR DETERMINING TORQUE EXERTED ON A SHAFT INCLUDING TRANSFERRING TORQUE TO A GEARBOX BY THE SHAFT AND EXERTING AXIAL FORCE ON THE SHAFT DEPENDENT ON THE TORQUE EXERTED BY THE SHAFT TO THE GEARBOX

BACKGROUND OF THE INVENTION

1. Field of the Invention

The invention relates to a drive unit, method and a device for determining a torque.

2. Description of the Related Art

The way in which torque is determined in the case of a drive has been hitherto been inaccurate. Furthermore, it has not hitherto been possible adequately to determine the torque of a rotating shaft of the drive. Thus, it is difficult to determine the torque dynamically.

SUMMARY OF THE INVENTION

In view of the foregoing, it is an object of the invention to determine a torque simply and accurately.

This and other objects and advantages are achieved in accordance with the invention by a method for determining a torque, where a shaft means a rotatable object that is suitable for transmitting a rotary movement from a drive element, such as an electric machine or a gearbox, to another technical element, for example a gearbox or a load. A continuous rotary movement of the shaft is in principle not necessary to transmit a torque from one technical element to another. However, a continuously occurring rotary movement of the shaft increases the accuracy of the determined torque.

An axial force means a force that acts on the shaft in an axial direction. The axial force is produced in the gearbox. To this end, the gearbox has at least two gear wheels with helical teeth, where one of the gear wheels with the helical teeth is attached to the shaft. The other gear wheel is advantageously mounted rotatably and in a fixed position.

Here, helical teeth means that the teeth of the gear wheel each run out of square to the axis of the shaft to which the gear wheel is attached. The angle of the teeth with respect to the axis of rotation of the gear wheel (shaft) is not necessarily constant across the width of the gear wheel. The characteristic shape of the teeth can thus also be generally curved, in particular in the shape of a segment of a circle or a parabola. In a particularly simple embodiment, the gear wheels respectively engaging in one another each have identical helical teeth.

Depending on the extent to which the teeth are helical, a corresponding axial force results from a torque which is present on the shaft and thus on the gear wheel. The axial force is applied to the shaft.

The axial force acts on the shaft and tries to displace the shaft in an axial direction. If the shaft is largely fixed in the axial direction, the axial force is advantageously determined with the aid of a force sensor. The force sensor can be associated directly with the shaft. If the shaft can move in the axial direction with the aid of a spring element, the axial position of the shaft can also be determined with a position sensor, in order to determine the axial force.

The torque is ultimately calculated from the measured axial force. In a simple case, the torque is proportional to the axial force. Here, the proportionality factor depends on the angle of the gearing, the spring strength and if appropriate other influencing variables such as friction.

The present invention advantageously permits determination of the torque, which is present on a shaft, with a high degree of accuracy. In particular, such a measurement is also possible in the case of a rotary movement of the shaft, without modifying the shaft itself.

In an advantageous embodiment of the method, the shaft can move axially and the axial force results in an axial displacement of the shaft. The displacement of the shaft is determined using a position sensor. The axial force is determined based on the displacement.

In the case of the axially movable shaft, the shaft is advantageously held in its axial position by at least one spring element.

With the position sensor, the position of the shaft relative to a housing of the gearbox or to a part of the drive element can be determined. Particularly advantageously, a position sensor is arranged in the gearbox itself and the position sensor determines the distance of the gear wheel with torque in relation to another gear wheel. For maximum accuracy, the position of the gear wheel, which is also attached to the shaft, is determined. It is also possible to locate the position sensor in the drive element, in particular to determine the position of a rotor in relation to the housing of the drive element. For such a case, the shaft is mounted in a non-axially fixed manner in at least the drive element.

A position sensor enables the axial position of the shaft to be determined particularly quickly and accurately. Thus, consequently, it is possible to quickly determine the torque on the shaft.

In a further advantageous embodiment of the method, two gear wheels of the gearbox, which are engaged with one another, partially convert the torque into an axial force.

Advantageously, the gear wheels engaging with one another are helical. Helical gear wheels already serve to provide a particularly low-noise transmission of rotary movements from one shaft to another. In the present embodiment, a torque that is exerted by a helical gear wheel onto another helical gear wheel results in an axial force. The axial force acts on the shaft that exerts the torque onto the other gear wheel.

By using helical gear wheels, an already advantageous embodiment is suitable for additionally determining the torque. Thus an advantage in the present embodiment of the gearbox is doubly exploited.

In a further advantageous embodiment of the method, the axial force is determined using a force sensor, where the force sensor is in contact with the shaft.

In a force sensor that determines the axial force of the shaft, the shaft can be mounted largely in an axially fixed position. To determine the axial force, the axial position of the shaft is hence changed only minimally, if at all.

The torque that is transmitted by the shaft to the gearbox can be calculated from the axial force using a simple calculation formula. As described above, in a first approximation a linear relationship exists between the axial force and the torque to be determined on the shaft.

A sensor that determines the force based on a piezo-element (piezo-force meter) is particularly suitable as a force sensor.

Using a force sensor, it is thus possible to determine the axial force particularly quickly, because the time taken for the shaft to move axially over a macroscopic path no longer applies.

In a further advantageous embodiment, the shaft is anchored in an axially fixed manner in a drive element, where the drive element and the gearbox are coupled via the force sensor and an axial displacement of the shaft by the axial force between the drive element and the torque converter results in a press force/tensile force between the gearbox and the drive element, and the press force/tensile force is determined by the force sensor. In the present embodiment, the press force/tensile force is advantageously measured between the gearbox and the drive element in order to determine the torque on a shaft that connects the drive element to the gearbox. Apart from small deviations, the axial force is identical to the press force/tensile force. Whether a press force or a tensile force is present between the drive element and the gearbox depends on the direction of the torque. Here, a drive element means, for example, a (rotating) electric machine, an internal-combustion engine or another gearbox. The drive element has a housing, where the force sensor is advantageously located between the housing of the drive element and the gearbox. The shaft can be mounted in the gearbox in an axially flexible manner and can be mounted in the drive element in an axially fixed manner. Thus, the axial force exerted on the shaft acts at the connection point of the gearbox and the drive element, i.e., if the housings of the gearbox and the drive element are adjacent to one another.

Particularly advantageously, due to the force sensor the shaft can be mounted in a largely axially fixed manner in the drive element and in a somewhat axially movable manner in the gearbox.

The present embodiment advantageously permits the determination of the press force/tensile force and thus the axial force and therefore the determination of the torque without influence from the shaft. In a drive unit comprising a gearbox and a drive element, the torque of a shaft that connects the gearbox and the drive unit can be determined quickly and reliably.

In a further advantageous embodiment of the method, the gearbox partially converts the torque of the shaft into the axial force thanks to helical gearing between two gear wheels of the gearbox.

To produce the axial force, two gearwheels in the gearbox are particularly suitable, where the torque to be determined is applied to one of the gearwheels. The shaft has a fixed connection to the gear wheel with torque. The gear wheel with torque engages in another, likewise helical, gear wheel. Due to the helical teeth of the gear wheels, the axial force acts on the gear wheel with torque and the gear wheel transmits the axial force to the shaft.

If the shaft is positioned in the gearbox in an axially fixed manner, the axial force that acts on the shaft can be determined using the force sensor. In an axially movable shaft, a position sensor can determine the position of the shaft and thus the axial force. The torque can be deduced from the axial force and the angle of the helical teeth.

Advantageously, the gear wheel that exerts the torque is anchored on the shaft in an axially fixed manner. By transmitting part of the torque into an axial force with the aid of gear wheels with helical teeth, the torque can be determined particularly easily. In particular, this way of determining the torque can also be retrofitted in an existing drive system.

In an advantageous embodiment of the device, the gear wheels have helical teeth. In this embodiment, at least the gear wheel upon which the torque acts, and the gear wheel that absorbs the torque of the shaft, are helical. Due to the embodiment in which the first two gear wheels are helical and fit together, a parallel implementation of the shafts in the gearbox is advantageously possible. Thus, the gearbox can be kept small and, in addition, the disclosed embodiments of the invention are suitable for use in planetary gearboxes.

In an advantageous embodiment of the device, a force sensor is provided for determining the axial force. Piezo-based force sensors are particularly suitable as force sensors (also referred to as force transducers). Piezo-based force sensors can determine forces highly dynamically (up to 50 Hz-100 Hz) and vary their dimensions only very slightly. Thus, they can be employed in drive systems or drive elements in which the shaft is mounted in a practically axially fixed manner. Force sensors additionally have a particularly long life and can, for example, be located on end faces of the shaft.

In another advantageous embodiment of the device, the shaft is mounted so that it can move axially and a position sensor is provided for determining the axial position of the shaft in relation to the gearbox.

In the case of an axially movable shaft, it is possible, particularly easily and accurately, to determine the axial force that acts on the shaft using a position sensor and/or a force sensor. A position sensor advantageously records the position of the shaft in relation to a housing of the gearbox or a further drive element. The position sensor particularly and advantageously records the position of an end face of the shaft. When determining the axial force by determining the axial position, the shaft is mounted in the axial direction advantageously with the aid of at least one spring element and is held in its axial position. The spring strength of the at least one spring element is included in the calculation of the torque from the axial position of the shaft.

By determining the position of the shaft in relation to a fixed element, such as the housing of the gearbox and/or the drive element, the axial position of the shaft can be determined very accurately and, thus, the torque can be determined accurately. In addition, a position measurement can be determined without any mechanical influence on the shaft.

In a further advantageous embodiment of the device, the shaft connects the gearbox and a drive element, where the shaft is mounted in the drive element in an axially fixed manner, and where a force sensor connects the gearbox and the drive element.

The shaft can also be mounted in a drive element in an axially fixed manner such that, in the case of an axial movement of the shaft, an axial movement of the drive element results. In this type of embodiment, a position sensor can determine the distance between the gearbox and the drive element.

A force sensor can likewise be located between the drive element and the gearbox. When using a force sensor, the drive element can be attached directly to the gearbox. The force sensor then connects the shaft to the housing of the gearbox. It is also possible to locate the force sensor between the housing of the gearbox and the housing of the drive element. In the latter embodiment, the connection of the two housings should not be so fixed that there is no play. In other words, a connection of the housings should be effected such that a movement of the housings with respect to one another is possible in a small range (up to approx. 1 mm).

The force sensor and/or the position sensor can also be integrated into one of the housings. In the case of a suitable ball bearing/roller bearing, it is in particular possible to determine the axial position of the shaft. It is hence advantageous to associate the force sensor and/or the position sensor with the shaft or with a ball bearing.

Due to this embodiment, a simple and low-cost solution can be advantageously provided, particularly in the field of electric mobility.

The invention in accordance with disclosed embodiments can be employed particularly advantageously in an electrically operated vehicle or in a partially electrically operated vehicle (hybrid vehicle). Furthermore, the disclosed embodiments of the invention can also be employed in the field of production machines or machine tools.

With the invention, the torque of a shaft can be dynamically monitored very easily. When a maximum torque, is exceeded a safety function can be activated.

The invention advantageously makes it possible to determine the torque directly in the case of a shaft. Advantageously, the torque can be determined in the case of a rotatable shaft without significantly influencing the torque of the shaft.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is further described and explained below using figures. The features shown in the figures can of course be combined by the person skilled in the art to form new embodiments without exceeding the boundaries of the invention, in which.

DETAILED DESCRIPTION OF THE EXEMPLARY EMBODIMENTS

Figure 1:
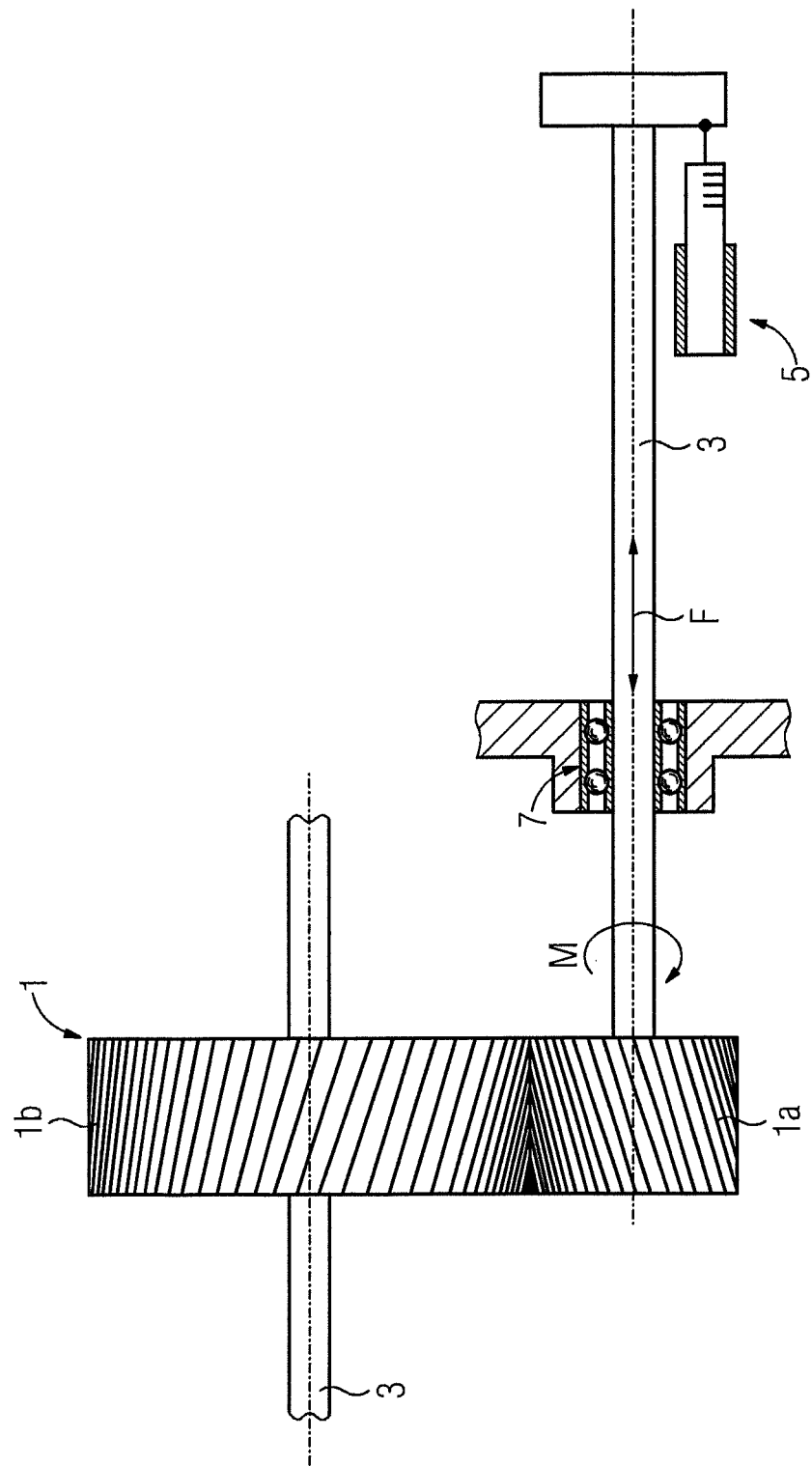
FIG. 1 shows the schematic structure of a device for determining a torque of a shaft.

FIG. 1 shows the schematic structure of a device for determining the torque M of a shaft 3. What is shown is a gearbox 1, represented by two coupled gear wheels 1a, 1b. The coupled gear wheels 1a, 1b have helical teeth. The helical teeth of the gear wheels 1a, 1b result in an axial force F on the gear wheel 1a in the case of a torque M that is transmitted from the shaft 3 to a gear wheel 1a. For purposes of simplification, it is assumed that the gear wheel 1b is fixed in the gearbox 1 in an axially fixed manner. The axial force F that acts on the shaft 3 results in an axial displacement of the shaft 3. In this case the direction of the axial force F onto the shaft 3 is aligned based on the direction in which the torque M of the shaft 3 acts, and based the direction of the gearing of the gear wheels 1a, 1b.

The displacement of the shaft 3 is enabled by variable bearings 7 of the shaft 3. The variable bearing 7 is in particular a ball bearing. Due to the axial displacement of the shaft 3, the force can be determined using a force sensor 5.

Instead of the force sensor 5, a position sensor 50 can also determine the axial position of the shaft 3. In order to determine the axial force F using a position sensor 50, a spring element is however still required, which counteracts the axial force F of the shaft.

Depending on how axially fixed the shaft 3 is mounted, a force sensor 5 or a position sensor 50 is more suitable for determining the axial force.

Figure 2:
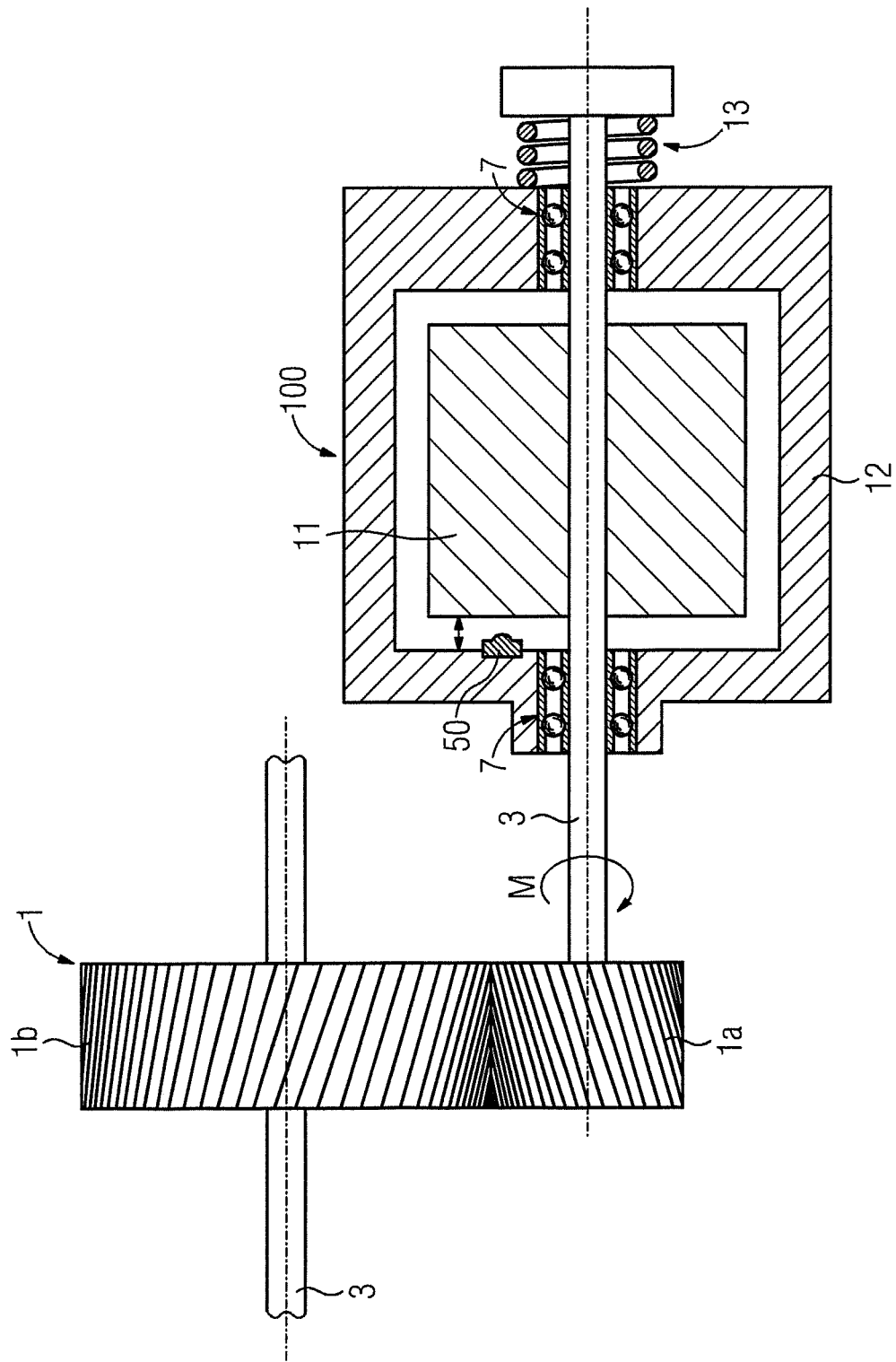
FIG. 2 shows a possible device for determining the torque of a shaft.

FIG. 2 shows a possible device for determining the torque M of a shaft 3. In the embodiment of the device shown here, the gearbox 1 is connected to a drive element 100 via the shaft 3. Here, the drive element 100 is an electric machine. The drive element 100 has a rotor 11, where the rotor 11 is fixedly connected to the shaft 3. The drive element 100 induces the torque M onto the shaft 3. The shaft 3 transmits the torque M to the gearbox 1. The gearbox 1 comprises two gear wheels 1a, 1b with helical teeth. Due to the helical teeth of the gear wheels 1a, 1b, an axial force F on the shaft 3 results from the torque M. Due to the axial force F, the shaft is moved in an axial direction. The shaft 3 is mounted so as to move axially in the drive element 100. The axial force F results in a deformation of the spring element 13, where the spring element 13 here is associated with the drive element 100. The spring element 13 can also be associated with the gearbox 1. Due to the spring element 13 and the variable bearing 7, i.e., a ball bearing, the shaft 3 can move axially. If an axial force F acts on the shaft 3, the shaft 3 is deflected elastically in its axial position. The axial deflection of the shaft 3 can be measured by a position sensor 50. Here, the position sensor 50 is used to measure the position of the rotor 11 of the drive element 100. Here, the position sensor 50 is arranged in the drive element 100. Here, the position sensor 50 is used to determine the axial position of the rotor 11 in the drive element 100. In this embodiment, the axial position of the shaft 3 is determined in this embodiment using the position sensor 50, and the torque M is calculated from the axial position of the shaft 3.

It should be readily understood the position sensor 50 can also be positioned in the gearbox 1.

Figure 3:
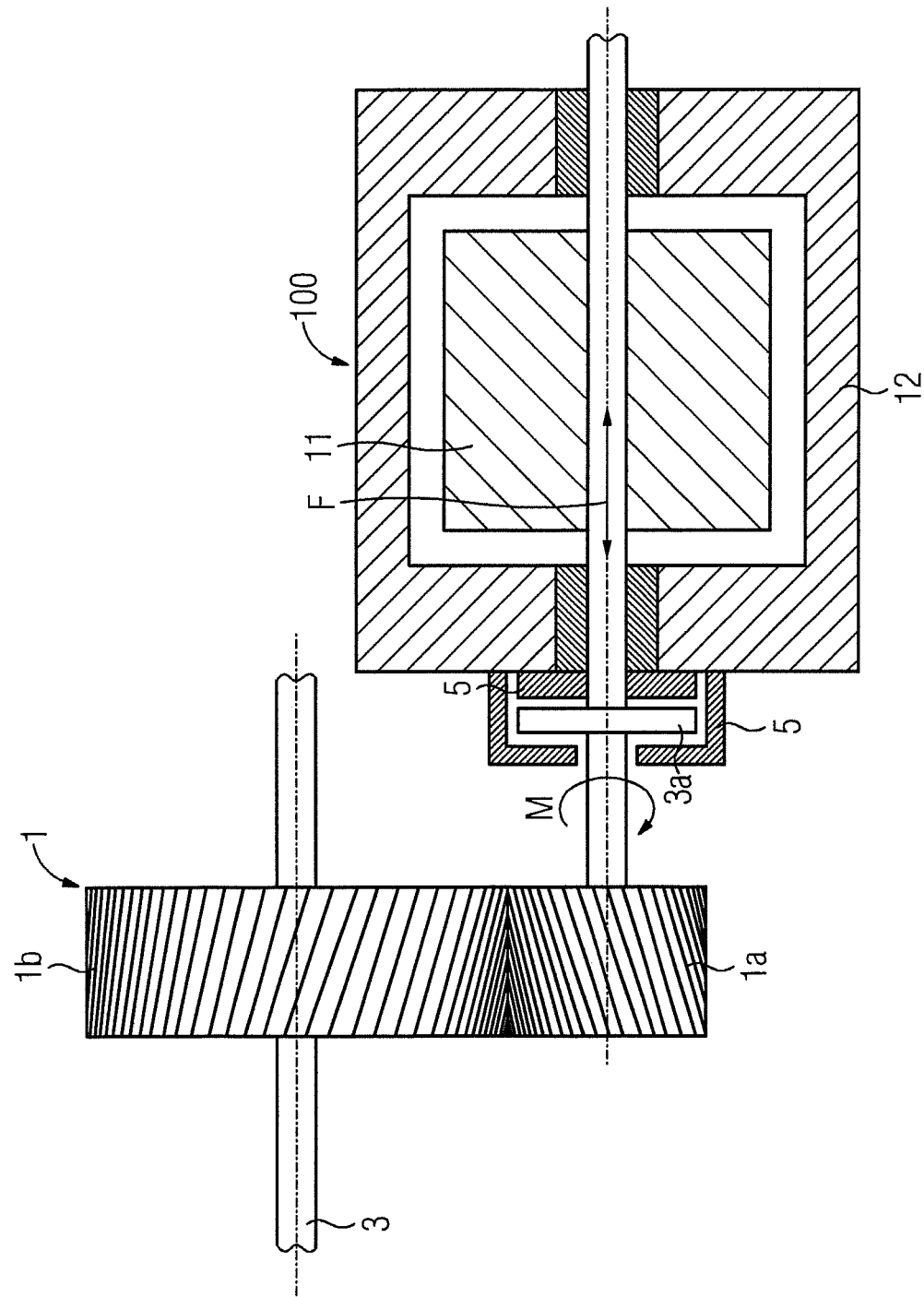
FIG. 3 shows a further possible device for determining the torque of a shaft.

FIG. 3 shows a further possible device for determining the torque M of a shaft 3. The helical gear wheels 1a, 1b result in the axial force F being applied to the shaft 3. The direction and amount of axial force F that is transmitted to the shaft 3 depends on the torque M which the shaft 3 transmits into the gearbox 1. The axial force F is exerted by the reciprocal effect of the helical gear wheels 1a, 1b on the shaft 3. The axial force is determined at the front of the drive unit 100.

In the region of the end face of the drive element 100, the shaft exhibits a broadening 3a in some areas. The broadening 3a can be effected using a ring, where the ring is connected to the shaft in an axially fixed manner. The broadening 3a adjoins a force sensor 5 on both sides. In the embodiment shown, the force sensors 5 are attached to the housing of the drive unit 100. Depending on the direction of rotation (forward/backward) of the shaft 3, an axial force F acts on the shaft 3 in an associated axial direction.

Depending on the direction of rotation of the shaft 3, the broadening 3a, which is shown on the end face of the drive element 100, hence impinges on the force sensor 5, or the force sensor that is positioned closer to the gearbox 1.

Depending on the embodiment of the force sensor 5, a radially fixed broadening 3a of the shaft 3 is advantageous, or a rotatably mounted broadening 3a of the shaft 3.

At least one of the force sensors 5 can also be associated with the gearbox 1. Advantageously, at least one of the force sensors 5 is then attached to the gearbox 1 (not shown in the FIG.).

Figure 4:
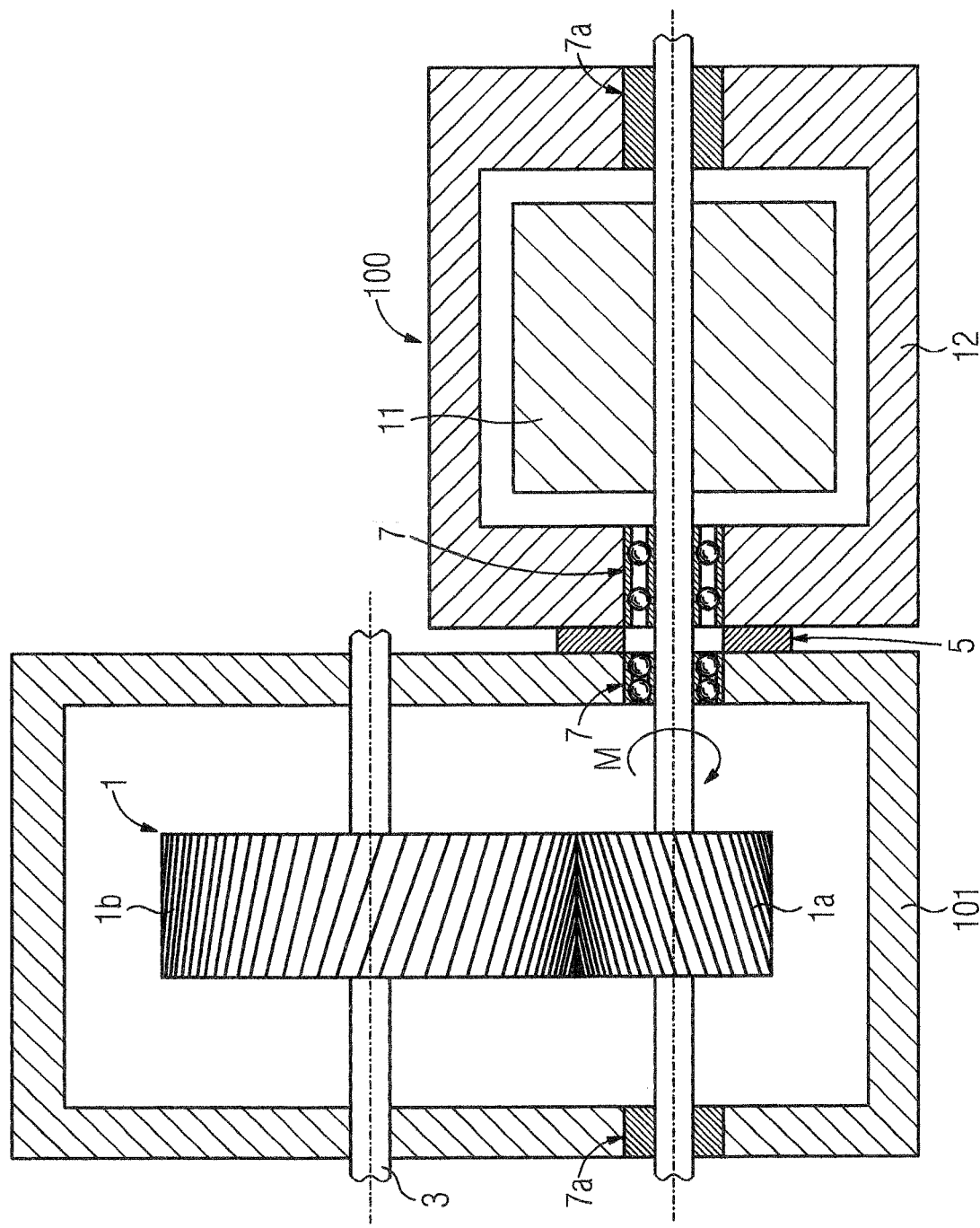
FIG. 4 shows a further embodiment of the device.

FIG. 4 shows a further embodiment of the device. In this embodiment, the gearbox 1 and the drive element 100 are arranged next to one another. The gearbox 1 is attached to the drive element 100 by at least one force sensor 5. The force sensor 5 is arranged between the gearbox 1 and the drive element 100. Here, the force sensor 5 is located between the housing 101 of the gearbox 1 and the housing 12 of the drive element 1. The force sensor 5 can also be integrated into the attachment of the drive element 100 to the gearbox 1. In each case, the shaft 3 is mounted in an axially fixed manner on those sides of the housings 101, 12 that do not adjoin the force sensor 5. The axially fixed mounting of the shaft 3 in the housing 12 can occur via a shaft bearing 7a, where the shaft bearing 7a ensures a rotatable and axially fixed mounting of the shaft 3.

The shaft 3 is mounted in an axially fixed manner on the end face of the drive element 100, which is not connected to the power sensor 5. A bearing 7a, i.e., a roller bearing, is used for the axially fixed mounting of the shaft 3. The shaft 3 is mounted in the gearbox on the end face, that is not connected to the force sensor 5, either so as to move axially with a variable bearing 7 or in an axially fixed manner with a bearing 7a. In the case of the structure shown, an axial force F exerted on the shaft 3 causes the axial force F to be transmitted to at least one of the housings 12, 101. The press force or tensile force which the housings 12, 101 exert on one another is determined by the force sensor 5 between the housings 12, 101. The press force or tensile force is produced by the axial force F. The torque M present on the shaft can be arithmetically deduced from the change in the determined axial force F.

In summary, the invention relates to a method and a device for determining the torque M of a shaft 3. In this case, gear wheels 1a, 1b engaging in one another in a gearbox 1 serve to apply an axial force F to the shaft 3. The axial force F is induced by helical teeth of the gear wheels 1a, 1 b. The axial force F of the shaft 3 is determined using a force sensor 5 and/or a position sensor 50. The torque M is determined arithmetically from the measured axial force F. The invention thus advantageously permits a static and dynamic measurement of the torque M on a shaft 3 to be performed.

Figure 5:
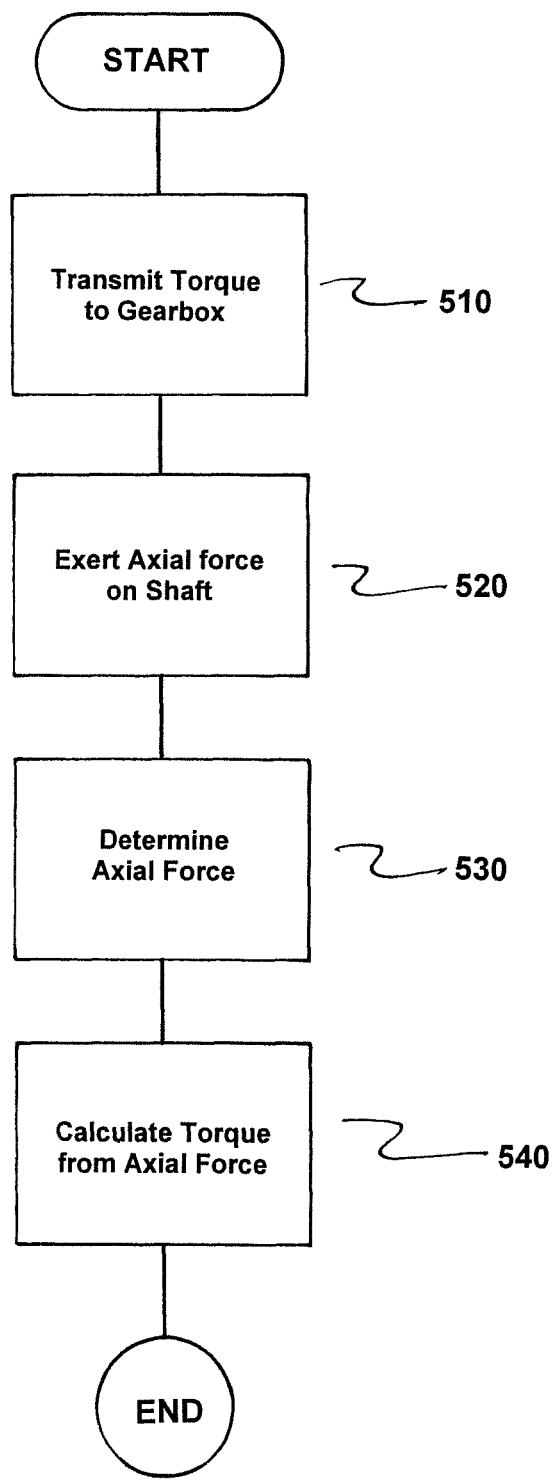
FIG. 5 is a flowchart of the method in accordance with the invention.

FIG. 5 is a flowchart of a method for determining a torque (M) which is exerted on a shaft (3). The method comprises transmitting via the shaft (3) transmits the torque (M) to a gearbox (1), as indicated in step 510. Next, an axial force (F) is exerted by the gearbox (1) on the shaft (3) as a function of the torque (M) which is exerted onto the shaft (3), as indicated in step 520. The axial force (F) is now determined, as indicated in step 530. The torque (M) is now calculated from the axial force (F), as indicated in step 540.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining a torque which is exerted on a shaft having a fixedly connected rotor, the method comprising:
    transmitting the torque to a gearbox via the shaft;
    exerting, by the gearbox, an axial force on the shaft as a function of the torque which is exerted onto the shaft;
    determining the axial force; and
    calculating the torque from the axial force;
    wherein the shaft is axially movable and the axial force causes an axial displacement of the shaft which is determined via a position sensor which determines a position of the rotor along an axial plane of the shaft, the axial force being determined based on the displacement;
    wherein the shaft is anchored in an axially fixed manner in a drive element;
    wherein the drive element and the gearbox are coupled via a force sensor and an axial displacement of the shaft by the axial force between the drive element; and
    wherein the gearbox creates a press force/tensile force between the gearbox and the drive element, the press force/tensile force being determined by the force sensor.

2. The method as claimed in claim 1, wherein the torque is partially converted into the axial force by two gear wheels of the gearbox engaging in one another.

3. The method according to claim 1, wherein the gearbox partially converts the torque of the shaft into the axial force via a helical gearing between gear wheels of the gearbox.

4. The method according to claim 1, wherein the shaft is the shaft of a drive element.

5. The device as claimed in claim 4, wherein the shaft is the shaft of a drive element.

6. The method according to claim 1, wherein the drive element comprises one of an electric machine and an internal-combustion engine.

7. A device for determining a torque of a shaft having a fixedly connected rotor which transmits the torque from a drive element to a gearbox configured to convert the torque into an axial force onto the shaft, comprising:
    a position sensor which determines an axial position of the rotor along an axial plane of the shaft in relation to the gearbox and which determines a displacement of the shaft by the axial force, the shaft being mounted so as to move axially; and
    a force sensor for determining the axial force;
    wherein the position sensor determines the axial force;
    wherein the torque is calculated based on the axial force;
    wherein the shaft is anchored in an axially fixed manner in a drive element;
    wherein the drive element and the gearbox are coupled via the force sensor and an axial displacement of the shaft by the axial force between the drive element; and
    wherein the gearbox creates a press force/tensile force between the gearbox and the drive element, the press force/tensile force being determined by the force sensor.

8. The device as claimed in claim 7, wherein the gearbox includes gear wheels; and wherein the gear wheels are helical.

* * * * *